April 21, 1936.  F. STUDER  2,038,455
APPARATUS FOR MAKING IMITATION COUNTERFEIT ARTICLES
Filed Jan. 19, 1934  2 Sheets-Sheet 1
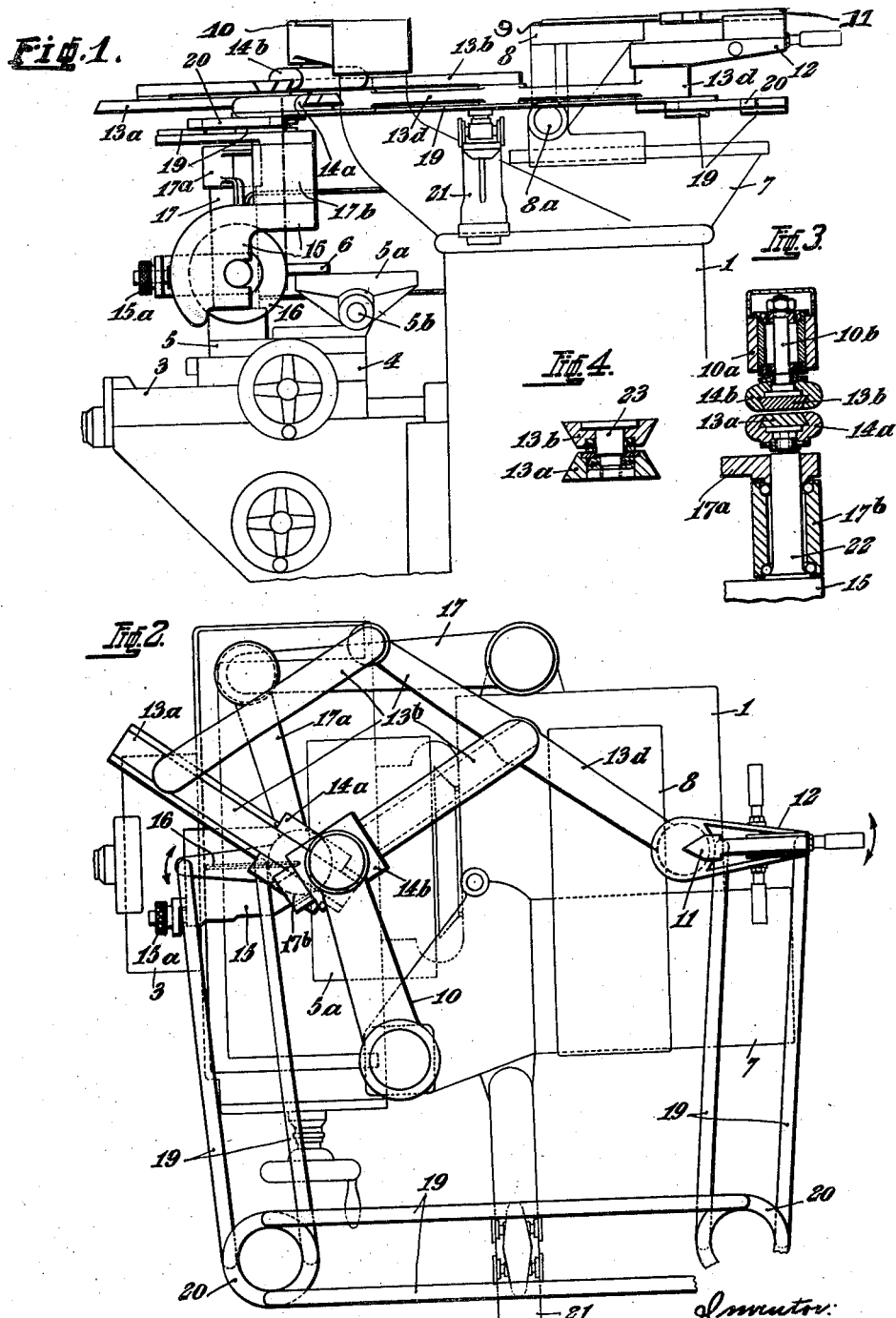

April 21, 1936.　　　F. STUDER　　　2,038,455
APPARATUS FOR MAKING IMITATION COUNTERFEIT ARTICLES
Filed Jan. 19, 1934　　2 Sheets-Sheet 2
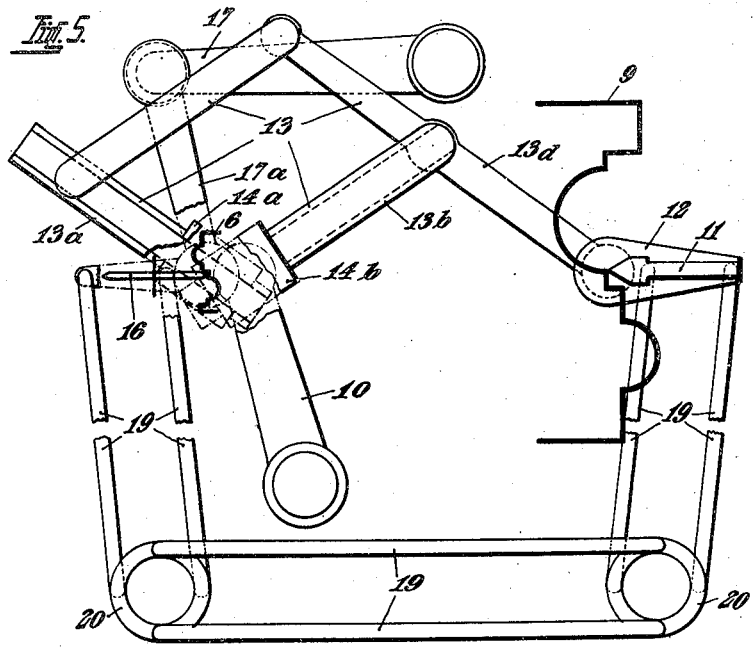
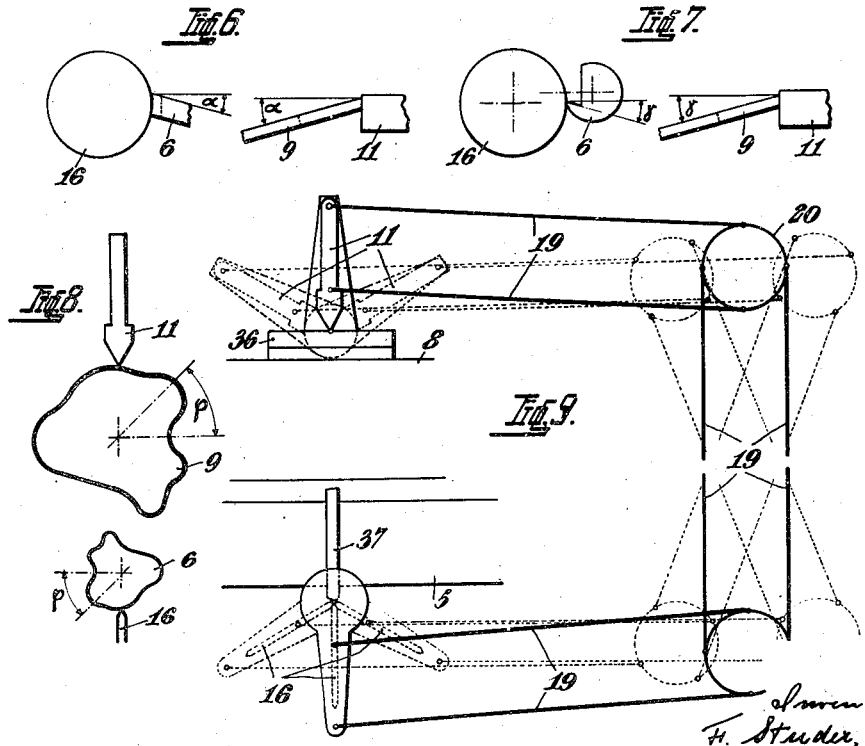

Patented Apr. 21, 1936

2,038,455

UNITED STATES PATENT OFFICE 2,038,455

APPARATUS FOR MAKING IMITATION COUNTERFEIT ARTICLES

Fritz Studer, Glockenthal, near Thoune, Switzerland

Application January 19, 1934, Serial No. 707,409
In Switzerland January 19, 1933

2 Claims. (Cl. 51—100)

This invention relates to methods of making imitation or counterfeit articles, and apparatus therefor, and has for one of its objects to provide an improved method and apparatus which can be used for grinding, turning, milling, shaping and measuring workpieces which can be worked with difficulty on ordinary machine tools.

To this end, according to the invention there is provided a method of making imitation or counterfeit articles which are, e. g. reduced, copies of an original or pattern, which method is characterized in that the movements of a feeler, which can swing in all directions about its point, and cooperates with the pattern to be copied, are transmitted, e. g. mechanically or hydraulically, to a tool which has a profile corresponding to the point-profile of the feeler and which can likewise swing in all directions about its working edge, for the purpose of enabling various profiles to be worked with the same tool each in one single operation, during which the feeler follows the periphery of a drawing, templet or the like.

For fashioning workpieces by grinding the profile of the edge of the grinding disc is fashioned or turned by this method to the exact shape of the point of the feeler but with a difference in size corresponding to the relative sizes of the workpiece and templet. To this end, according to a feature of the invention, the feeler may be moved in various angular positions along a straight edge while the grinding disc has imparted to it a corresponding angular setting and is moved past a cutting tool, e. g. a diamond.

For giving the desired profile to flat forming tools the templet or pattern and the workpiece may be inclined at an angle corresponding to the clearance of the forming tool.

The invention also provides apparatus for carrying into practice the method described above, wherein a feeler mounted to swing in all directions about its point is operatively connected with a tool carrier mounted to swing about a vertical axis, the working profile of the tool on which carrier corresponds to the point-profile of the feeler and lies in said axis.

According to another feature of the invention, the feeler carrier may be coupled by means of a pantograph and also by means of a parallelogram linkage with the tool carrier.

Conveniently, a fashioning device, e. g. a diamond, for turning the grinding wheel is so arranged on the worktable that by moving the latter the point of the fashioning device can be placed in the axis of swinging of the tool carrier, and a straight edge for the feeler is provided, the arrangement being such that by shifting the feeler in various angular positions along the straight edge, the grinding wheel has its periphery in corresponding angular positions moved past the fashioning device for giving to the profile shape of the feeler-point a magnitude corresponding to the ratio of transmission of the pantograph.

Other features of the invention will be described hereinafter and pointed out in the claims.

One form of grinding machine adapted for carrying the improved method into practice is illustrated by way of example in the accompanying drawings, wherein:—

Figure 1 shows partly the grinding machine in side elevation,

Figure 2 is a plan thereof,

Figure 3 is a vertical section through a swinging head of the grinding-wheel carrier and suspension means of a pantograph, Figure 4 is a vertical section through a rocker point of the pantograph, Figure 5 is a diagram of the parts serving for transmitting the movements, Figure 6 is a diagram illustrating the setting of the templet and workpiece for the clearance grinding of a flat steel forming tool, the tool and workpiece being shown at the left and the templet and feeler at the right, Figure 7 is a diagram showing the setting of a templet and workpiece for working a round forming tool, Figure 8 is a diagram showing the setting of a templet and workpiece for working a profile whose periphery is only partly situated within range of the feeler and tool, and Figure 9 is a diagram showing the device for turning a grinding-wheel corresponding to the point-profile of the feeler.

Like reference characters designate like parts throughout the several views.

Referring to the drawings, a sliding carriage 2 provided with a transverse slide 3 and a longitudinal slide 4 is guided to move vertically on a pedestal or base 1 of a milling or grinding machine. The sliding carriage 2 is automatically moved up and down, and its stroke can be adjusted to the height of the workpiece 6. A clamping table 5 of the longitudinal slide 4 has clamped on it a work table 5a. This work table can be tilted about a horizontal axis 5b in order to be able to manufacture or grind workpieces having angular portions, e. g. shaped tools. For use with rotatable workpieces, i. e. those of circular cross-section, instead of the work table 5a a spindle and headstock may be mounted on the longitudinal slide 4.

The pedestal 1 also has mounted on it a support 7, on which are arranged a templet table 8 and a suspension arm 10 of a pantograph 13, 14. A two-part articulated arm 17, 17a is also pivoted on the support 7, through the head 17b of which beam extends a vertical axle 22 of a grinding head 15, at its upper end this axle 22 is rotatably connected with a sliding guide 14a of the pantograph limb 13a. A sliding guide 14b of the pantograph limb 14 is mounted in a head 10a of the arm 10 to rotate about a vertical axle 10b, as shown in Figure 3. The limbs 13a and 13b are pivotally connected together by an axle 23 having a countersunk head, as shown in Figure 4. The ratio of transmission of the pantograph can be adjusted in known manner within the usual limits.

A feeler holder 12 carrying a feeler 11 is mounted to swing on the free end of a pantograph arm 13d. The point of the feeler 11 lies exactly in the axis of rotation of the holder 12, and the axis of rotation of the grinding head 15 lies at a tangent to the periphery of a grinding-wheel 16.

A parallelogram linkage 19 having three members with rings 20 at the joints serves for transmitting the movement of the feeler 11 to the grinding wheel 16, the middle member of the linkage being supported on an arm 21.

The periphery of the grinding wheel 16 must have the exact profile of the feeler point as regards magnitude corresponding to the ratio of transmission at any given time. For this purpose it is fashioned or turned by means of the described device, as well as by means of a straight edge or ruler 36 that is fast on the templet table 8, and a diamond clamped on the table 5. The diamond 37 is set on the table 5 exactly in the axis of rotation of the grinding head 15. The grinding wheel can be adjusted for fashioning it by a screw 15a. The feeler 11 is then moved in all angular positions along the straight edge 36, as shown in Figure 9. The grinding disc likewise moves in the same angular positions past the diamond and is fashioned or shaped by the same, so that the profile of its periphery corresponds exactly to that of the point of the feeler. The described apparatus can now be used for working or making workpieces according to a templet clamped on the table.

A workpiece 6 of flat shape, such as a gauge templet, forming tools or the like is fastened on the tiltable table 5a, and the templet or pattern to be copied is fastened on the templet table 8 which can likewise be tilted about an axis 8a.

For rough shaping of the profile, broader and blunter feelers and grinding wheels can be used than are necessary for the final grinding.

The profile of the templet is produced on the workpiece by passing the feeler over the entire shape while moving the feeler continuously in the angular position suitable for working the workpiece. The grinding wheel is shifted in relation to the workpiece in correspondence with the movement of the feeler in relation to the pattern or templet by means of the pantograph. The angular setting at any time i. e. the swinging of the feeler about its point, is transmitted to the tool by the parallelogram linkage 19, 20.

For making flat forming tools the work table 5a is slanted corresponding to the desired angle. The slanting position of the workpiece results in a correct profile shape owing to the pattern templet 9 being set at the same angle, as shown in Figure 6. In the horizontal position of the workpiece the finished profile is normal.

If the forming tool is to be recessed or undercut then the pattern or templet will be inclined still further through an additional angle which can be obtained or discovered by trial.

For round forming tools with a recess not undercut the centres of the workpiece and grinding wheel are staggered a distance apart equal to that of the centre from the line of cut on the finished tool, so that the centre of the grinding wheel or milling cutter lies in the horizontal plane of the cutting edge of the finished workpiece, the templet lying horizontally. In that way the exact profile is obtained at the height of cut of the tool. If round forming tools are to be worked whose cutting edge is undercut (Figure 7), then the pattern templet is inclined moreover a corresponding angle.

Patterns can be copied having their peripheries only partly within range of the feeler and tool. For this purpose, the workpiece and templet will be arranged to rotate about an axis at right angles to the same, and both will be rotated through the same angular distance until the entire periphery has been worked, as illustrated in Figure 8. This arrangement is particularly adapted for working punches and the like.

For milling workpieces, a milling tool may be used instead of the grinding wheel.

Instead of templets, finished workpieces may be used for being copied by the feeler, in which case in place of the templet table a table with spindle and headstock may be mounted for receiving parts of round section.

In the example described above the arrangement of the parts is such that the movement of the swinging feeler in relation to a fixed templet is transmitted to the tool. It is also possible for the feeler and tool to remain stationary and to move the templet and workpiece in relation to the feeler and tool respectively, for it is only essential to provide relative movement between the tool and workpiece.

It is also possible to use the method according to the present invention for measuring and inspecting profiles when the tool, or instead thereof a second feeler, is moved along the profile of the workpiece and by observing the movement of the other feeler in relation to a templet drawing or other pattern, the deviations from the same are determined.

The swinging movement of the feeler may also be imparted to the carrier of the tool by means of a flexible or jointed shaft, a chain drive or hydraulically controlled gearing.

I claim:—

1. Apparatus for making imitation articles from a pattern comprising in combination a feeler mounted to swing about a point movable along the pattern, a grinding wheel carrier mounted to swing about an axis, a grinding wheel carried by said carrier and having a working profile corresponding to the point-profile of said feeler, the top of the point-profile of said grinding wheel lying in said axis, a feeler carrier mounted to swing about an axis lying in the point of said feeler but at right angles to the swinging plane of the latter, a pantograph for transmitting the movements of one of said carriers to the other carrier, a parallelogram linkage for transmitting the oscillation movements of said feeler carrier to said grinding wheel carrier, a work table movably arranged adjacent said grinding wheel, a fashioning device for said grinding wheel so arranged on said work table that by moving the latter the point of the fashioning device can be placed in the axis of swinging of said grinding wheel carrier and a straight edge with which said feeler can cooperate, the arrangement being such that by shifting the feeler in various angular positions along said straight edge, the grinding wheel has its periphery moved in corresponding angular positions past the fashioning device for giving to the wheel the profile shape of the feeler-point of a magnitude corresponding to the ratio of transmission of the pantograph.

2. Apparatus for making imitation articles from a pattern, comprising in combination a feeler mounted to swing about a point movable along the pattern, a tool carrier mounted to swing about an axis, a tool carried by said carrier and having a working profile corresponding to the point-profile of the feeler, the top of the point-profile of said tool lying in said axis, a feeler carrier mounted to swing about an axis lying in the point of said feeler but at right angles to the swinging plane of the latter, a pantograph for transmitting the movements of one of said carrier to the other carrier and a parallelogram linkage for transmitting the oscillation movements of said feeler carriers to said tool carrier, said linkage having three members with rings at the jointed points, the middle member of said linkage being supported on a bracket of the standard.

FRITZ STUDER.